March 12, 1940.  C. W. HARROLD ET AL  2,192,908
ACCELERATING ROTARY FEEDER
Filed Sept. 1, 1936  8 Sheets-Sheet 2

INVENTORS
CHARLES W. HARROLD
JAMES R. WOOD
CHRISTEN R. KADDELAND
BY Kwis, Hudson & Kent
ATTORNEYS.

March 12, 1940.   C. W. HARROLD ET AL   2,192,908
ACCELERATING ROTARY FEEDER
Filed Sept. 1, 1936   8 Sheets-Sheet 3

INVENTORS.
CHARLES W. HARROLD
JAMES R. WOOD
BY CHRISTEN R. KADDELAND
Kwis, Hudson & Kent
ATTORNEYS.

March 12, 1940.  C. W. HARROLD ET AL  2,192,908
ACCELERATING ROTARY FEEDER
Filed Sept. 1, 1936  8 Sheets-Sheet 4

INVENTORS.
CHARLES W. HARROLD
JAMES R. WOOD
BY CHRISTEN R. KADDELAND
Kwis, Hudson & Kent
ATTORNEYS.

March 12, 1940.  C. W. HARROLD ET AL  2,192,908
ACCELERATING ROTARY FEEDER
Filed Sept. 1, 1936  8 Sheets-Sheet 5

INVENTORS
CHARLES W. HARROLD
JAMES R. WOOD
CHRISTEN R. KADDELAND
BY Kwis Hudson & Kent
ATTORNEYS

March 12, 1940.    C. W. HARROLD ET AL    2,192,908
ACCELERATING ROTARY FEEDER
Filed Sept. 1, 1936    8 Sheets-Sheet 8

FIG. 15

INVENTORS
CHARLES W. HARROLD
JAMES R. WOOD
BY CHRISTEN R. KADDELAND
Kwis, Hudson & Kent
ATTORNEYS.

Patented Mar. 12, 1940

2,192,908

UNITED STATES PATENT OFFICE 2,192,908

ACCELERATING ROTARY FEEDER

Charles W. Harrold, University Heights, Ohio, and James R. Wood and Christen R. Kaddeland, Shelton, Conn., assignors to Harris-Seybold-Potter Company, Cleveland, Ohio, a corporation of Delaware Application September 1, 1936, Serial No. 98,900

35 Claims. (Cl. 271—53)

This invention relates to improvements in accelerating rotary feeders, and has reference particularly to sheet feeders for transferring sheets to a continuously rotating cylinder, such for instance as the impression cylinder of a printing press.

One of the objects of this invention is the provision of mechanism of the type described capable of high speed operation and accurate register of the sheets.

Another object is the reduction of that portion of the cycle of a printing press required to properly register the sheet and transfer it to the press, or differently expressed, to provide means whereby a relatively long sheet may be printed on a cylinder of given diameter.

Another object is the provision of sheet transfer mechanism adapted for use with sheet separating and forwarding mechanism, in which the sheets are forwarded in lapped formation.

Another object is the provision of drive mechanism for a variably rotating transfer member in which the operating elements are of simple design, capable of economical manufacture and readily adjustable for proper operation and compensation for wear.

Other objects and features of novelty will appear as we proceed with the description of that embodiment of the invention which, for the purposes of the present application, we have illustrated in the accompanying drawings, in which:

Figure 1:
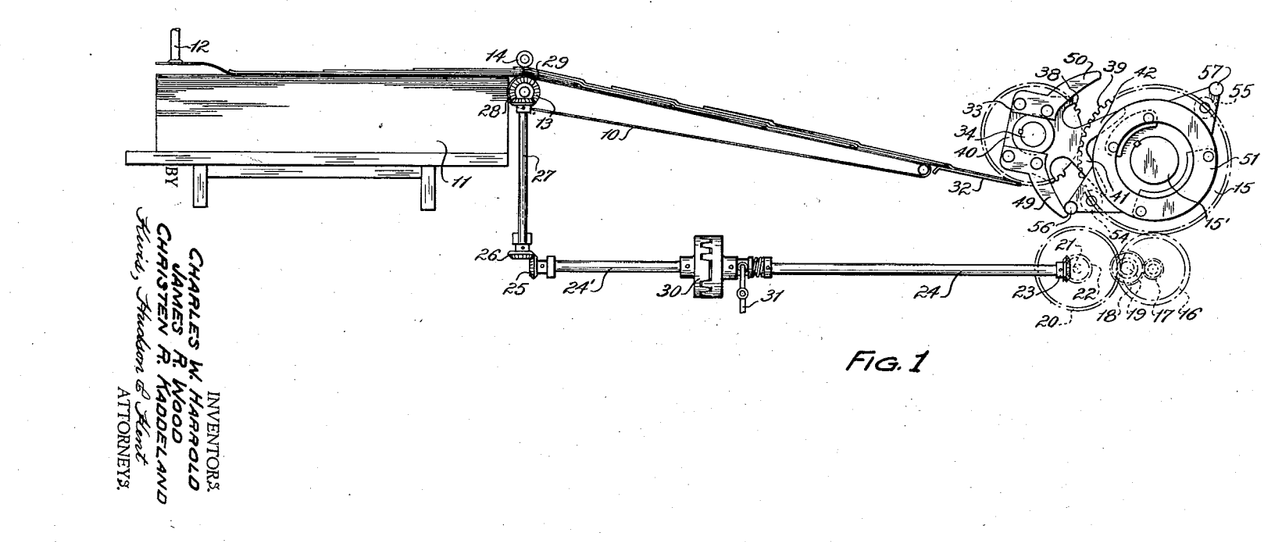
Fig. 1 is a diagrammatic elevational view of a stream feeder for sheets, a rotary transfer member and a fragment of a printing press, embodying the invention.

In Fig. 1 of the drawings 10 represents a series of endless tapes upon the upper run of which the sheets are transported in stream feed order, that is each sheet lapping several of the sheets which follow it. The sheets are taken from a pile 11, each sheet being lifted at its rear edge and moved forward a certain distance by means of suckers 12, this movement being sufficient to carry the forward edge of the sheet into the space between the roller 13 which drives the tapes 10 and a hold-down roller 14 which rides upon the stream of sheets.

From that point on the roller 13 and the tapes 10 impart movement at a constant rate but at slow speed compared with the surface speed of the sheet during its travel through the printing press.

Inasmuch as the printing press per se forms no part of the present invention, we have illustrated one cylinder 15 only of such a press, and this would ordinarily be an impression cylinder. As is common in rotary printing presses, and as illustrated in Fig. 1 of the drawings, this cylinder is adapted to accommodate a sheet of a length greater than one-half the circumference of the cylinder. The drive for the tapes 10 may come from the shaft 15' on which the cylinder 15 is mounted, a suitable gear on that shaft driving a gear 16 which is keyed to a shaft that carries a pinion 17 meshing with a gear 18 that is rigid with a pinion 19 which meshes with a gear 20 on a shaft 21. Driving force is therefore transmitted through this speed reducing gear train to shaft 21, which carries a bevel pinion 22 that meshes with a bevel pinion 23 on a shaft 24, 24', the opposite end of which is connected by bevel pinions 25 and 26 with an upwardly extending shaft 27 which drives tape roller 13 through bevel pinions 28 and 29. It is sometimes convenient to stop the feeding of the sheets temporarily without interrupting any part of the mechanism in advance thereof. To this end we may provide a clutch in the driving connections for the stream feeder. Such a clutch is diagrammatically illustrated herein at 30 in Fig. 1, with a clutch shifting lever 31.

The foremost sheet of the stream is caused to run over a feed board 32 directly beneath a transfer member 33 mounted on a shaft 34 suitably journaled in the frame of the printing press. The transfer member 33, in transferring this sheet from the feed board 32 to the impression cylinder 15, starts from rest after gripping the sheet and accelerates to the surface speed of cylinder 15, releasing the sheet to that cylinder, continues forward at uniform speed for a time, and then decelerates to a stop preparatory to taking the next succeeding sheet.

Figure 2:
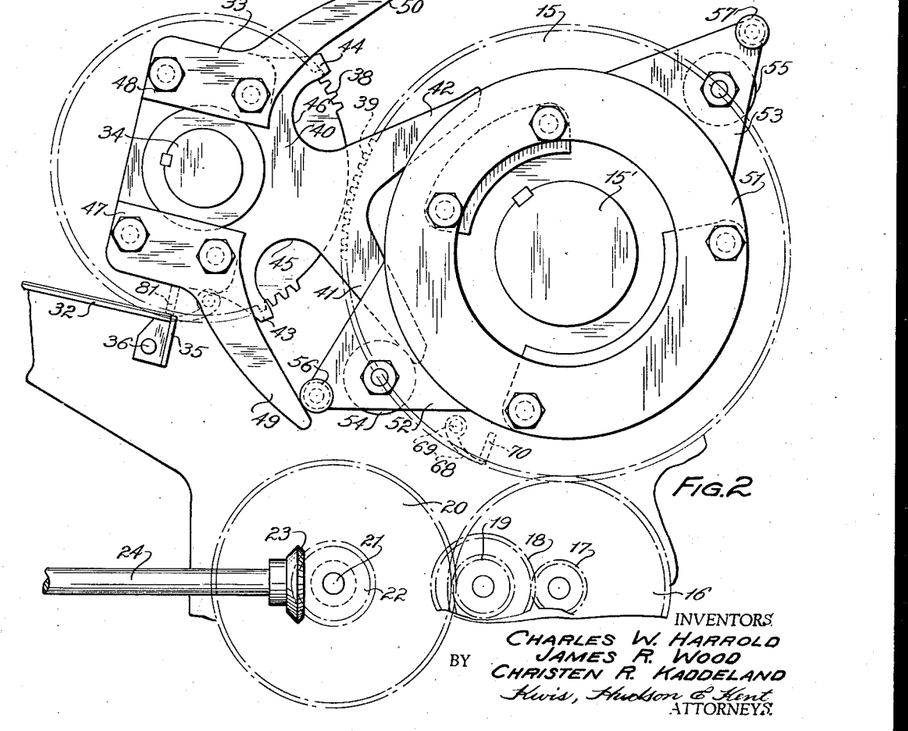
Fig. 2 is a fragmental elevational view of the sheet transfer mechanism, on a larger scale, in the same position as Fig. 1, which is the position it occupies at the beginning of the accelerating movement.
Figure 3:
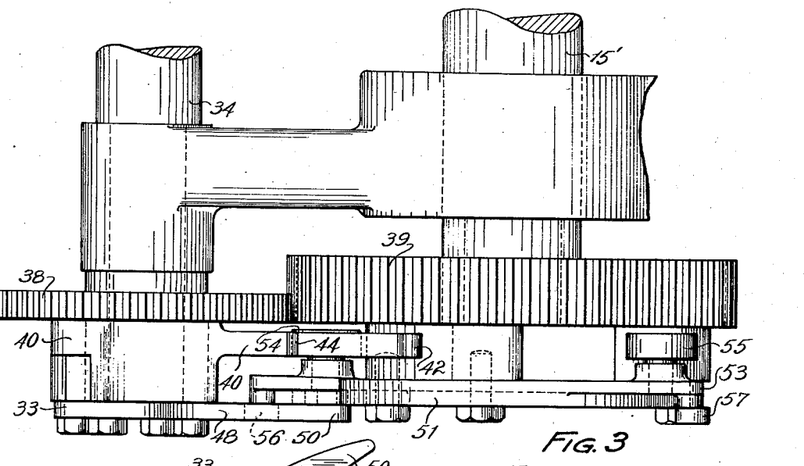
Fig. 3 is a plan view of the same.

In Figs. 1 and 2 the mechanism is shown in the position in which the transfer member 33 has just gripped a sheet and is about to start forward to transfer the sheet to the impression cylinder 15. A series of transversely aligned stops 35 of the usual form are mounted upon a shaft 36, which is pivotally mounted in the frame. The foremost sheet, just before it is taken by the transfer member, is registered against these stops. Thereafter the stops are swung down out of the way by means which will be described hereinafter.

Shaft 34 carries a segmental gear 38, all parts of which conform to a circle. This gear segment meshes at times with a circular gear 39 on shaft 15', thereby imparting to transfer member 33 a constant speed motion during a considerable part of each cycle. Shaft 34 also carries a plate 40, which has a fan-shaped projection extending outwardly beyond the gear 38. This projection comprises two cam fingers 41 and 42. Plate 40 also has two minor projections 43 and 44 which are spaced from the cam fingers 41 and 42 respectively, with semi-circular pockets 45 and 46 intervening.

Attached to the plate 40, but spaced therefrom, there are two further cam plates 47 and 48 having outwardly extending cam fingers 49 and 50. The cam surfaces are on the inner edges of cam fingers 49 and 50 and on the outer edges of cam fingers 41 and 42. The cam fingers 41 and 49 together form a cam slot, whose sides lie in different planes, and the same is true of cam fingers 42 and 50.

On shaft 15' of the impression cylinder there is mounted a plate 51 which carries two triangular brackets 52 and 53. On the rear side of these brackets there are mounted two wheels or rollers 54 and 55 adapted to run upon the cam fingers 41 and 42 respectively. These rollers are centered on the pitch circle of the gear 39. On the forward sides of the brackets 52 and 53, and at their outer extremities, are two smaller rollers 56 and 57 adapted to run upon the cam fingers 49 and 50 respectively.

Figure 8:
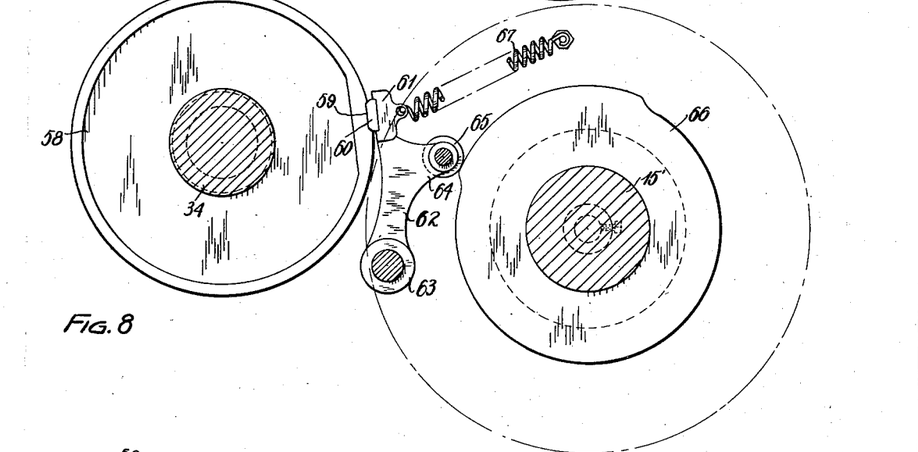
Fig. 8 is a view, partly in section on the line 8—8 of Fig. 9, showing the locking means for the transfer member in operative position, this view corresponding substantially to Fig. 7 in so far as the position in the cycle is concerned.
Figure 9:
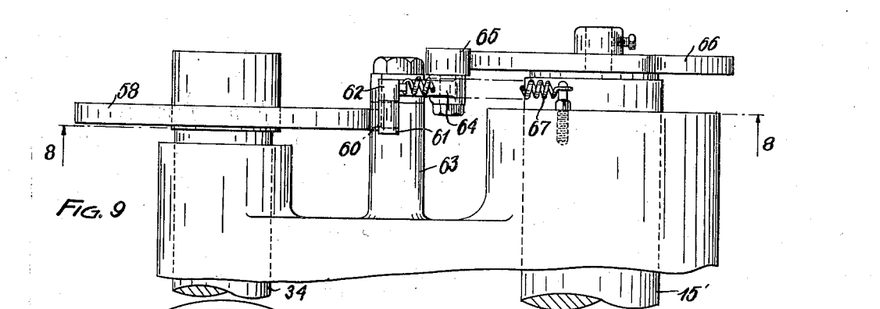
Fig. 9 is a plan view of Fig. 8.
Figure 10:
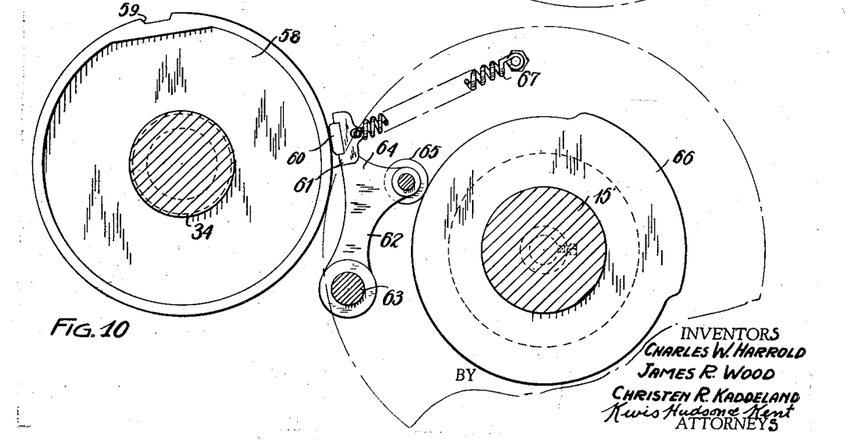
Fig. 10 is a view similar to Fig. 8, showing the lock released.

Referring now to Figs. 8, 9 and 10, means are provided for positively holding and locking the transfer member in stationary position during a portion of its cycle. This means is at the side of the machine opposite the driving means. Shaft 34 has a disk 58 rigidly secured thereto, in the periphery of which there is a notch or socket 59 which is adapted to receive a block 60 that is carried in a lateral extension 61 on the end of a lever 62, the opposite end of which is pivotally mounted on a stud 63 carried by the frame. Lever 62 has an arm 64 upon which is rotatably mounted a follower roller 65 which runs upon a cam disk 66 that turns with the shaft 15'. A coil spring 67 holds follower 65 against its cam, and withdraws block 60 from notch 59 when the cam permits, thereby unlocking transfer member 58 as indicated in Fig. 10.

On the impression cylinder 15 there are a set of sheet grippers 68 of usual construction, pivotally mounted about an axis 69 and working against a gripper contact bar 70, these parts functioning in the usual manner. The grippers for the transfer member however are mounted and actuated in a novel manner which will now be described, reference being had particularly to Figs. 11 and 12. The shaft 34 of the transfer member is suitably journaled in side members of the frame. Near its ends and in the middle it carries clamp brackets 37 (one only of which appears in the drawings), which embrace the shaft and are fixed in position thereon by means of clamping screws 71. In aligned openings in these brackets there is journaled a shaft 72, which has pinned thereto arms 73 that are provided with journals in which is oscillatably mounted a gripper shaft 74. Sheet grippers 75 are fixed to this shaft. In the outer end of one of the arms 73 there is a pin 76 upon which a small roller 77 is rotatably mounted. This roller is a cam follower, as will presently appear. The pin 76 also extends into an eye at the lower end of a pin 77', the upper end of which slides in a guide 78 carried by the bracket 37, a coil spring 79 being interposed between the guide 78 and a collar 80 on the pin. The arms 73 are adapted to swing around the axis of shaft 72 inwardly from the position shown in Fig. 11 against the action of spring 79. Grippers 75, when closed, press against a gripper contact bar 81 which has an arcuate apron 82 of conventional form. This gripper contact bar is secured to the clamp brackets 37 and its inner edge acts as a stop for the arms 73 to prevent the latter from swinging outwardly beyond a predetermined point.

One end of gripper shaft 74 extends beyond its journal in the corresponding arm 73 and has pinned thereto a lever arm 83 which carries a roller 84 at one end and at the other end is provided with a pin and spring which may be identical with pin and spring 77' and 79 previously described, the pin sliding through another hole in guide 78. However, in order to distinguish between these two springs we have marked the spring for lever 83 on Fig. 12 of the drawing with the reference numeral 79'.

Figures 11, 12:
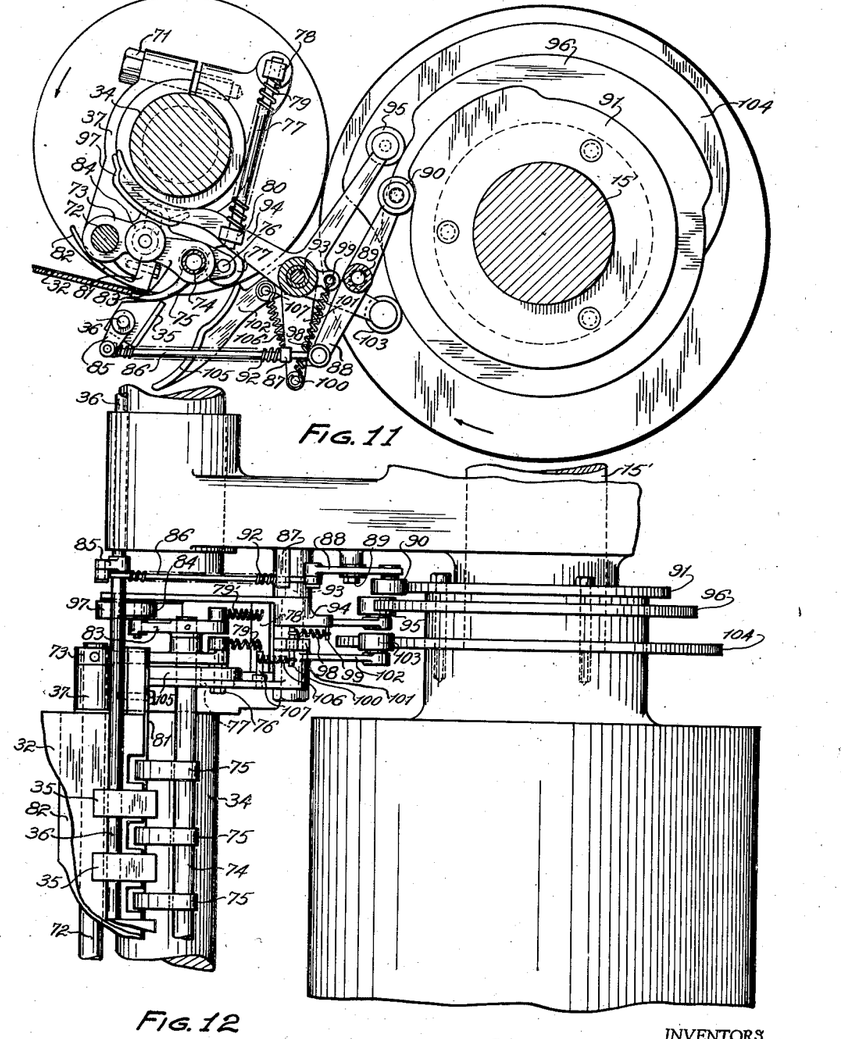
Fig. 11 is an elevational view, partly sectional and partly diagrammatic, showing the control means for the sheet grippers and front stops in the positions which they occupy at approximately the beginning of the acceleration period of the transfer member.
Fig. 12 is a bottom plan view of the same.

The shaft 36 upon which the front stops 35 are mounted is journaled in the frame and carries a crank arm 85, by which it is swung from operative to inoperative position and vice versa. This crank is operated by a connecting rod 86 which projects through a guide block 87 and is pivotally connected with one end of a lever 88 oscillatably mounted on a stud 89 projecting inwardly from the frame, the other end of this lever carrying a follower 90 running on a cam 91 carried by the shaft 15' of the impression cylinder. A coil spring 92 surrounding rod 86 and bearing against guide 87 tends to hold the follower 90 in engagement with its cam and to hold the stops 35 in withdrawn or inoperative position.

Extending inwardly from one of the frame members there is a stud 93 upon which is rotatably supported a bell crank lever 94, one arm of which has a follower 95 that runs upon a cam 96 carried by the impression cylinder. The other arm of the bell crank is provided with a cam 97 that is adapted to cooperate with roller 84 on lever 83. This cam 97 and roller 84 act to open the gripper elements 75, the springs 79 acting to close them. The roller 95 is held against its cam by means of a tension spring 98 attached at its upper end to a pin 99 anchored in a lug extending from the hub of lever 94, the lower end of this spring being attached to the pin 100 carried by the lower end of a bracket 101 which extends downwardly from stud 93.

On this same stud 93 we mount a second bell crank lever 102, one arm of which carries a roller follower 103 that runs upon a cam 104 fastened to the impression cylinder shaft 15'. The other end of this lever has a cam surface 105 which is adapted to cooperate with roller 77, by means of which the gripper assembly may be swung bodily around the axis of shaft 72, so as to withdraw the grippers from their normal position into the position illustrated in Fig. 15. A coil spring 106 attached to pin 100 and to a pin 107 on lever 102 acts to withdraw cam 105 whenever the roller 103 runs off the high spot of its cam 104.

*Operation.*—The transfer member 33, in transferring a sheet from the feed board 32 to the impression cylinder 15, starts from rest after gripping the sheet and accelerates to the surface speed of the cylinder, releases the sheet to the impression cylinder, continues forward at uniform speed for a time, and then decelerates to a stop preparatory to taking the next sheet.

Figures 4, 5:
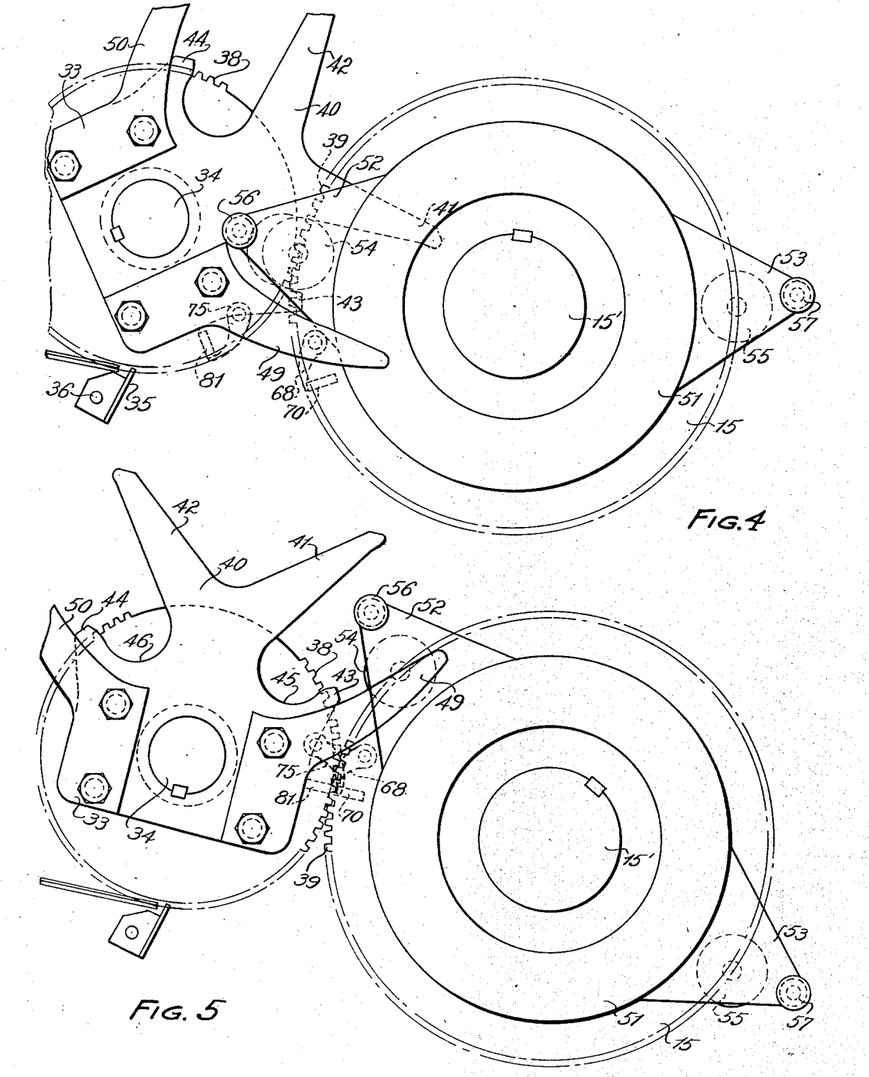
Fig. 4 is a view corresponding to Fig. 2 showing the parts in the position which they occupy after acceleration is completed and the constant speed portion of the transfer member movement is about to begin.
Fig. 5 shows the same parts at the position of transfer of a sheet from the transfer member to the impression cylinder.

In Figs. 1 and 2 the mechanism is shown in the position in which the transfer member has just gripped a sheet and is about to start forward to transfer it to the impression cylinder. The stops 35 are still in operative position. They are now swung down by the spring 92, Fig. 11, the high spot of cam 91 moving out from under follower 90 to permit this action. As soon as the stops 35 are out of the way the roller 54 begins to run onto cam finger 41, the roller 56 also engaging the cam surface of cam finger 49 at about the same time. The action of roller 54 on cam 41 produces a steady acceleration of the transfer member, so that rotation of that member is started without shock, and the rate of movement of the gripped sheet is quickly advanced to that of the surface of impression cylinder 15. When the roller 54 has reached the line of centers of shafts 15' and 34, as indicated in Fig. 4, the surface speed of the transfer member is exactly equal to that of the impression cylinder, and at this point the gear segment 38 of the transfer member meshes with the gear 39 of the impression cylinder, and the drive is taken over by these gears. At this point the roller 56 leaves cam finger 49, and the roller 54 which is then between the cam finger 41 and the projection 43 begins to move out of engagement with these cam elements.

The transfer member then proceeds at uniform speed until the position of Fig. 5 is reached, at which time the gripper contact bars 70 and 81 come into register on the line of centers between the shafts 34 and 15'. At this point the grippers 75 open, releasing the sheet, and the grippers 68 close to engage the sheet and transfer it to the impression cylinder. We have not herein illustrated the specific means for operating the gripper fingers in making this transfer, as such means are well known in the art and do not per se form any part of the present invention. This transfer is made, it will be observed, after the constant speed movement of the transfer member has been in progress for approximately 45° of movement of that member. The smooth transfer of the sheet is thereby assured.

Figure 6:
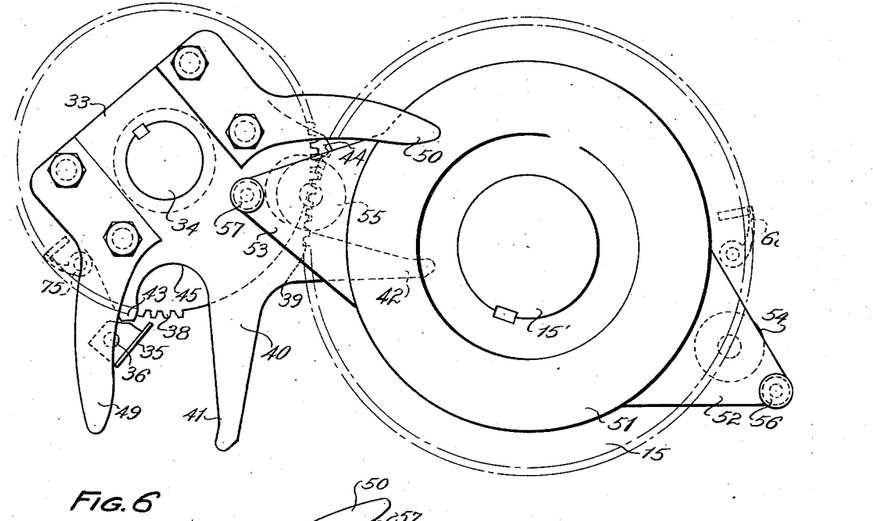
Fig. 6 is a view showing the parts in the position which they occupy at the time when the constant speed motion of the transfer member is completed and the motion of deceleration is about to begin.

The rotation of the transfer member at a constant rate of speed then continues for a considerable portion of the cycle, or until the opposite end of gear segment 38 comes around to the meshing position, as indicated in Fig. 6. At this point the roller 55 on the impression cylinder stands in the pocket between cam finger 42 and projection 44. The gear segment then goes out of mesh. The transfer member of course possesses momentum, and it is the function of the roller 55 in conjunction with the cam finger 42 to oppose this momentum and gradually decelerate the transfer member. This the roller does as it rolls out along the surface of the cam finger, the roller 57 in the meantime engaging and running upon the cam finger 50. When the roller 55 reaches the outer end of cam finger 42, as illustrated in Fig. 7, the deceleration of the transfer member is complete, and the latter begins its stationary period.

Figure 13:
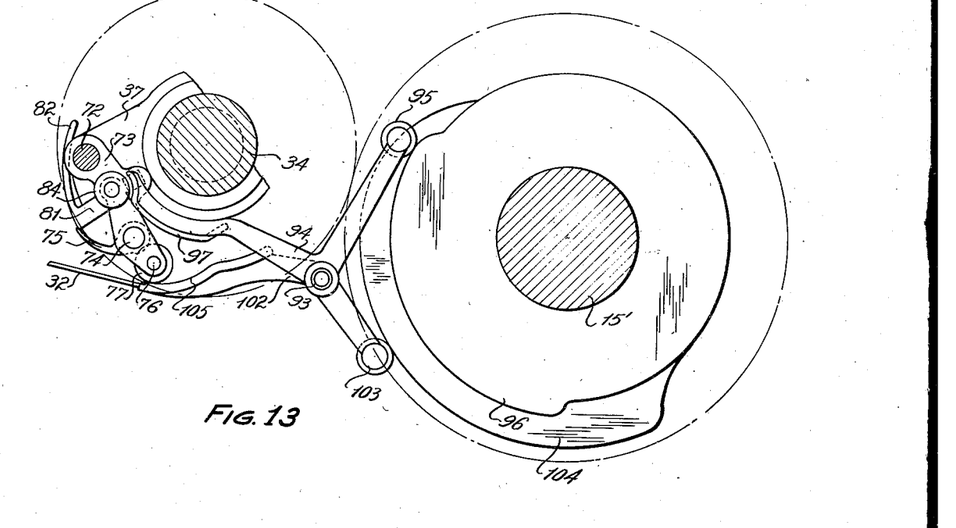
Fig. 13 is a fragmental view corresponding to Fig. 11 showing the grippers in normal closed position at the end of the uniform speed portion of the motion of the transfer member.
Figure 14:
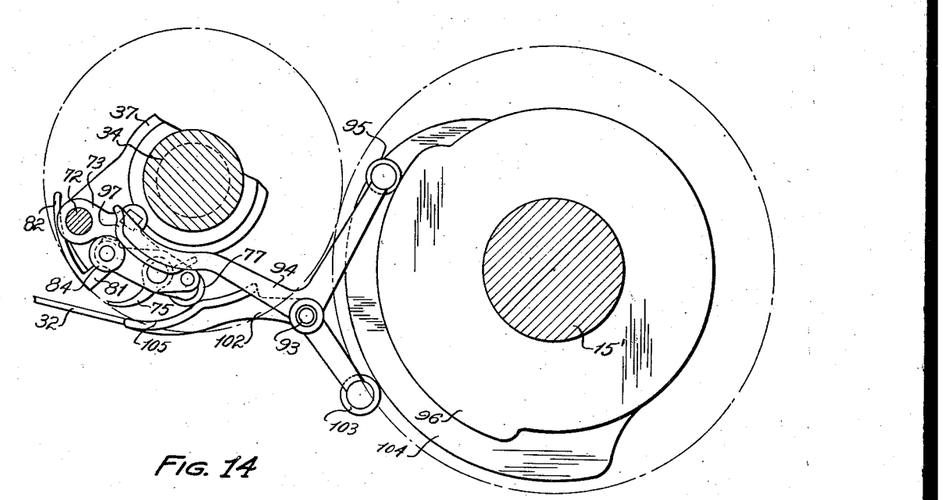
Fig. 14 is a similar view showing the grippers withdrawn and open during the deceleration period.

When the high spot of cam 91 engages roller 90, the stops 35 swing up into operative position. Presently the foremost sheet of the stream moves into engagement with the stops and is registered thereby. It is also given its sidewise register by any suitable known means. At about the time the deceleration of the transfer member begins, its gripper mechanism occupies the position illustrated in Fig. 13, the gripper shaft 74 is in its normal outer position, and the grippers 75 are closed. The cams 97 and 105 are in operative position but have not yet begun to be effective. A short time later the rotation of the transfer member in its movement of deceleration causes roller 84 to ride up onto the high spot of cam 97, opening the grippers. It also causes roller 77 to run up the inclined surface of cam 105, retracting grippers 75, shaft 74, and arms 73 by swinging them around the axis of shaft 72. The grippers are then entirely out of the way of the foremost sheet, and can pass it without any danger of damage. This condition is illustrated in Fig. 14. Furthermore by means of this construction the grippers clear a sheet whose forward edge has been transferred to the impression cylinder but whose rear portion still lies on the feed board at the time the transfer member returns to sheet gripping position.

Figure 15:
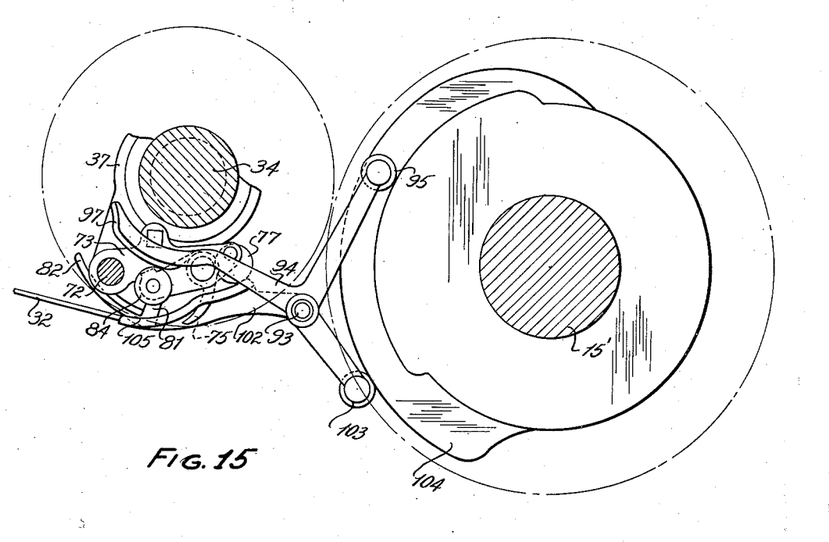
Fig. 15 is a similar view showing the grippers in open and withdrawn position during the stationary period of the transfer member cycle.

At the end of the motion of deceleration the parts stand in the condition illustrated in Fig. 15, where they may remain for a short portion of the cycle. Then, while the transfer member is stationary the rollers 103 and 95 run off the high spots of cams 104 and 96 respectively, permitting the gripper assembly to swing to its outer position and thereafter permitting the grippers to move to closed position to grip a sheet against the gripper contact bar 81.

Figure 7:
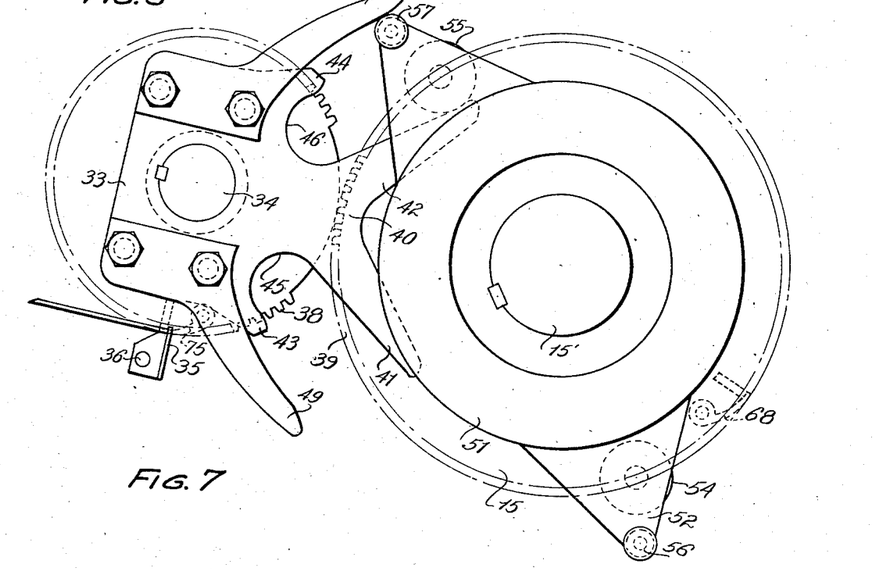
Fig. 7 shows the parts at the time of completion of the motion of deceleration.

At the end of the period of deceleration, corresponding to Fig. 7, the high spot of cam 66 comes into engagement with follower 65, Fig. 8, and thereby causes block 60 to engage socket 59 in the disk 58 attached to the transfer member. The latter is thereby positively locked against movement in either direction, and it remains in that condition until the next movement of acceleration begins, in other words until the roller 54 moves from the position of Fig. 7 back to the position of Fig. 2, when the cycle is complete.

If at any time something occurs to interfere with the regular feeding of sheets by the stream feeder the feeder may be stopped either manually or automatically by throwing out the clutch 30. Should this occur when the forward edge of the foremost sheet is a trifle short of the stops, in other words is not quite in position to be gripped by the transfer member, the sheet will not be damaged by the grippers because they are withdrawn each time they move around past the forward edge of the sheet.

During normal operation the small rollers 56 and 57 do not have the function of advancing the transfer member, forward motion of that member being controlled by the larger rollers 54 and 55. The small rollers in cooperation with the cam fingers 49 and 50 act as a steadying influence to hold the rollers 54 and 55 in contact with their cams. They have the further function of producing rotation of the transfer member in the reverse direction when the impression cylinder is reversed. It will be seen that the provision of means for avoiding interference between the grippers on the transfer member and a sheet partly or wholly on the feed table makes possible the return of the transfer member to its stationary position at any desirable time without regard to the position of the sheets. This construction furthermore makes possible the advancing of the forward edge of each sheet to the front guides immediately after the rear edge of the preceding sheet has passed the guides. The latter condition permits the feeding of a relatively long sheet to a cylinder of given diameter and is especially advantageous when sheets are forwarded to the front guides in lapped formation. The construction is, however, also adapted for use with forwarding mechanism of the usual type in which the sheets are not lapped.

Having thus described our invention, we claim:

1. In combination, means for feeding sheets one after another in lapped relation to a position of rest, a support for a sheet in said position of rest, a sheet handling cylinder, a non-uniformly rotating transfer mechanism adapted to transfer from said position of rest to said sheet handling cylinder during each revolution thereof, a sheet of a length greater than half the circumference of the latter cylinder, said mechanism comprising grippers for gripping the forward edge of each sheet, and means for causing the grippers to clear the path of the sheet over said support as they move in the direction of sheet travel past said position of rest.

2. In combination, means for feeding sheets one after another in lapped relation to a position of rest, a supporting element for a sheet in said position of rest, a sheet handling cylinder, an intermittently rotating transfer mechanism for transferring a sheet from said position of rest to said sheet handling cylinder for each revolution of the latter, said mechanism comprising an element for gripping the forward edge of each sheet, and means altering the position of one of said elements for causing clearance between said gripping element and the path traversed by a sheet in passing to said position of rest on said supporting element as the gripping element moves in the direction of sheet travel past said position of rest, said gripping element being operated to close upon the sheets while said transfer mechanism is stopped.

3. In sheet feeding mechanism, a continuously rotating sheet handling cylinder, a sheet transfer member cooperating therewith having variable rotary movement, means for driving the transfer member through a complete revolution for each revolution of said sheet handling cylinder, means for presenting one sheet at a time to said transfer member in a path beneath and substantially tangent thereto and with each sheet partially lapping the next following sheet, sheet gripping means on said transfer member, and means for withdrawing said sheet gripping means from the path of the sheets for clearance purposes as the sheet gripping means moves in the direction of sheet travel past the point of tangency.

4. In combination, means for stream feeding sheets, a sheet handling cylinder, a non-uniformly rotating transfer mechanism between said stream feeding means and said cylinder turning with one revolution for each revolution of said sheet handling cylinder in a direction corresponding with the direction of travel of the sheets, said mechanism comprising grippers arranged to grip the forward edge of the foremost sheet while the grippers are at rest relative thereto, said transfer mechanism accelerating the gripped sheet and transferring it to the sheet handling cylinder, and means for causing the grippers to clear the path of the sheet as they move in the direction of sheet travel past the sheet gripping position.

5. In combination, a printing machine comprising an impression cylinder, a rotary transfer member having grippers for gripping the forward edge of the sheet and delivering it to said impression cylinder, said transfer member in each rotation having a stationary period, an accelerating period, and a decelerating period, means for feeding sheets to the transfer member, stops adapted to register the forward edge of the sheet, and means for causing said grippers to clear the path of the sheet as they move past said stops during said decelerating period and to close on a sheet during said stationary period.

6. In combination a printing machine comprising a constantly rotating impression cylinder having sheet grippers, a rotary transfer member having grippers for gripping the forward edge of the sheet and advancing the same toward said impression cylinder grippers, said transfer member in each rotation having a stationary period, an accelerating period, and a decelerating period, means for feeding sheets one after another in lapped relation to the transfer member, stops adapted to register the forward edge of the sheet, means for causing said grippers to clear the path of the sheet as they move past said stops during said decelerating period, and means for causing said grippers thereafter to move into operative position and close against the sheet prior to said accelerating period.

7. In combination, a printing machine comprising a frame, a constantly rotating impression cylinder, a rotary transfer member having grippers for gripping the forward edge of the sheet, said transfer member in each rotation having a stationary period, an accelerating period and a decelerating period, means for stream feeding sheets to the transfer member at a rate of travel which is a fraction of the rate of peripheral movement of the impression cylinder, stops adapted to register the forward edge of the foremost sheet, means for causing said grippers to clear the path of the sheet as they move past said stops during said decelerating period, means for causing said grippers thereafter to move into operative position and close against the sheet, and means for positively holding said transfer member in stationary position while said grippers close.

8. In combination, a printing machine comprising a frame, a constantly rotating impression cylinder, a rotary transfer member cooperating therewith having grippers for gripping the forward edge of the sheet, said transfer member in each rotation having a stationary period, an accelerating period and a decelerating period, means for stream feeding sheets to the transfer member at a rate of travel which is a fraction of the rate of peripheral movement of the impression cylinder, stops adapted to register the forward edge of the foremost sheet, means for moving said grippers inwardly of the transfer member before the termination of the decelerating period to enable the grippers to pass the stops without intersecting the path of the foremost sheet approaching said stops, means for causing the grippers to move outwardly again during the stationary period and into gripping engagement with the foremost sheet, and a latch device for locking said transfer member in stationary position as said grippers move into gripping engagement with said sheet.

9. In combination, a printing machine comprising a frame, an impression cylinder, a rotary transfer member cooperating therewith having grippers for gripping the forward edge of the sheet, said transfer member in each rotation having a stationary period, an accelerating period and a decelerating period, means for stream feeding sheets to the transfer member at a rate of travel which is a fraction of the rate of peripheral movement of the impression cylinder, stops adapted to register the forward edge of the foremost sheet, means for moving said grippers inwardly of the transfer member before they pass the said stops, means for causing the grippers to move outwardly again after they pass the stops, and means for closing them against the foremost sheet prior to the accelerating period of the transfer member.

10. In combination, a printing machine comprising a frame, an impression cylinder, a rotary transfer member having grippers for gripping the forward edge of the sheet, said transfer member in each rotation having a stationary period, an accelerating period and a decelerating period, means for stream feeding sheets to the transfer member at a rate of travel which is a fraction of the rate of peripheral movement of the impression cylinder, stops adapted to register the forward edge of the foremost sheet, and means carried by the machine frame and actuated by continuously rotating cams for withdrawing said grippers inwardly of the transfer member and opening them before they pass the said stops, and means for moving said grippers outwardly again and closing them against the foremost sheet after they pass the stops and prior to the accelerating period of the transfer member.

11. In a printing press, a constant speed impression cylinder, a rotary sheet transfer member adapted to remain stationary for a portion of its cycle of operation, and connections between said cylinder and said member comprising two cams on said transfer member and two rollers on said impression cylinder, said rollers being at different distances from the center of the impression cylinder and spaced laterally, said connections being operative to accelerate said transfer member from its stationary condition to the speed of the impression cylinder.

12. In a printing press, a constant speed impression cylinder, a rotary sheet transfer member adapted to remain stationary for a portion of the cycle of operation, means operatively connecting the impression cylinder and transfer member for driving the latter including a cam carried by the transfer member and means coacting with said cam carried by the impression cylinder, and locking means for holding the transfer member in its stationary position.

13. In mechanism of the class described, a continuously rotating driving member, an intermittently rotating driven member, and connections between said members comprising cams on the driven member only and means on the driving member only coacting with said cams for imparting variable movement to the driven member.

14. In mechanism of the class described, a continuously rotating driving member, an intermittently rotating driven member, rollers on said driving member only, cams on said driven member only with which said rollers cooperate to produce acceleration and deceleration of said transfer member, and gearing between said driving and driven members for producing constant speed rotation of said driven member between successive periods of acceleration and deceleration.

15. In mechanism of the class described, a continuously rotating driving member, an intermittently rotating driven member, rollers on said driving member only, cams on said driven member only with which said rollers cooperate to produce deceleration and acceleration of said transfer member and locking means for holding said driven member stationary between periods of deceleration and acceleration.

16. In a printing press, a constant speed impression cylinder, a rotary transfer member having a stationary period during which it may grip a sheet and an accelerating period during which its peripheral speed is increased to that of the impression cylinder for facilitating the delivery of a sheet to the impression cylinder, mechanism for actuating the transfer member from the impression cylinder comprising cams carried by the transfer member and two rollers carried by the impression cylinder adapted to run upon said cams, one cam and one roller only being in engagement at any time, circular gear teeth on the transfer member and on the impression cylinder adapted to mesh between engagements of the rollers with said cams, whereby to impart constant speed drive to the transfer member during that period, and a further pair of cams and rollers on the transfer member and impression cylinder working in opposition to said first named cams and rollers, whereby the first named cams and rollers are maintained in operative relation throughout their periods of engagement without regard to load conditions.

17. In a printing press, a constant speed impression cylinder, a rotary transfer member having a stationary period during which it may grip a sheet and an accelerating period during which its peripheral speed is increased to that of the impression cylinder for facilitating the delivery of a sheet to the impression cylinder, mechanism for actuating the transfer member from the impression cylinder comprising circular gear teeth on the transfer member intermeshing with circular gear teeth on the impression cylinder, cams carried by the transfer member, two rollers carried by the impression cylinder centered on the pitch circle of its gear teeth, each of said rollers being arranged to run at different times upon one of said cams, a further pair of cams on the transfer member and a pair of rollers on the impression cylinder adapted to engage said second named cams, said last named rollers being carried by the impression cylinder on centers outside of the pitch circle of its gear teeth.

18. In a printing press, a constant speed impression cylinder, a rotary transfer member having a stationary period during which it may grip a sheet and an accelerating period during which its peripheral speed is increased to that of the impression cylinder for facilitating the delivery of a sheet to the impression cylinder, mechanism for actuating the transfer member from the impression cylinder, said mechanism comprising circular gear teeth on the transfer member and impression cylinder meshing through a portion of the cycle only, cams carried by the transfer member, two rollers carried by the impression cylinder centered on the pitch circle of its gear teeth, each of said rollers being arranged to run at different times upon one of said cams, a further pair of cams on the transfer cylinder and a pair of rollers on the impression cylinder adapted to engage with said second named cams, one of said last named rollers and the corresponding cam being arranged to disengage each other before the gear teeth come into mesh after acceleration of the transfer member, and the other second named roller and cam being arranged to engage each other on deceleration after the gear teeth go out of mesh.

19. In a printing press, a constant speed impression cylinder, a rotary transfer member having a stationary period during which it may grip a sheet and an accelerating period during which its peripheral speed is increased to that of the impression cylinder for facilitating the delivery of a sheet to the impression cylinder, mechanism for actuating the transfer member from the impression cylinder, said mechanism comprising circular gear teeth on the transfer member and impression cylinder meshing through a portion of the cycle only, cams carried by the transfer member, two rollers carried by the impression cylinder centered on the pitch circle of its gear teeth, each of said rollers being arranged to run at different times upon one of said cams, said transfer member and impression cylinder having further cams and rollers tending to hold the first named cams and rollers in contact throughout their periods of engagement, one of said second named cams and the corresponding roller being arranged to disengage each other before the gear teeth come into mesh after acceleration of the transfer member, and the other cam and roller of the second set being arranged to engage on deceleration after the gear teeth move out of mesh.

20. In a printing press, a constant speed impression cylinder, a rotary transfer member having a stationary period during which it may grip a sheet and an accelerating period during which its peripheral speed is increased to that of the impression cylinder for facilitating the delivery of a sheet to the impression cylinder, mechanism for actuating the transfer member from the impression cylinder, said mechanism comprising circular gear teeth on the transfer member and impression cylinder meshing through a portion only of the cycle, cams carried by the transfer member, two rollers carried by the impression cylinder centered on the pitch line of its gear teeth, each of said rollers being arranged to run at different times upon one of said cams, said transfer member and impression cylinder having further cooperating cams and rollers tending to hold the first named cams and rollers in contact throughout their periods of engagement, the points of engagement between said last named cams and rollers being at all times outside of the pitch circle of the impression cylinder gear teeth.

21. In apparatus of the class described, a sheet handling cylinder, a transfer member arranged to cooperate therewith, driving connections between said sheet handling cylinder and said transfer member comprising a fan-shaped projection carried by the transfer member, a roller carried by the sheet handling cylinder adapted to run onto one edge of said fan-shaped projection to accelerate the motion of the transfer member, another roller on the cylinder adapted to run off the other edge of the fan-shaped projection to decelerate the motion of the transfer member, and means carried by the cylinder and transfer member functioning to hold said rollers substantially in contact with the respective edges of said fan-shaped projection throughout their periods of engagement.

22. In mechanism of the class described, a sheet handling cylinder revolving continuously, a sheet transfer member cooperating therewith, and means for operatively connecting said cylinder and transfer member to produce interrupted motion in said transfer member, said means comprising gear teeth on the cylinder and transfer member meshing through a portion only of the cycle, two pairs of cams on the transfer member, and two pairs of cooperating rollers on the cylinder for accelerating motion of the transfer member prior to the meshing of the gear teeth and for decelerating motion of the transfer member after the gear teeth move out of mesh, said cams and rollers being adapted to accelerate and decelerate the transfer member in a reverse direction when the direction of rotation of the cylinder is reversed.

23. In combination, a printing machine comprising a continuously rotating cylinder, a rotating transfer member cooperating therewith having grippers for gripping the forward edge of the sheet, said transfer member in each rotation having a stationary period, an accelerating period, and a decelerating period, means for locking the transfer member against movement during said stationary period, means for feeding sheets one after another in lapped relation to the transfer member, stops adapted to register the forward edge of the sheet in position to be taken by said transfer member, means for causing the grippers to clear the path of the sheet during said decelerating period, and means effective while the transfer member is locked for causing said grippers to move into sheet gripping position.

24. In combination, a printing machine comprising a continuously rotating cylinder, a rotating transfer member having grippers and and gripper contact means for gripping the forward edge of the sheet and a shaft carrying said grippers, said transfer member in each rotation having a stationary period, an accelerating period and a decelerating period, means for feeding sheets one after another in lapped relation to the transfer member, stops adapted to register the forward edge of the sheet in position to be taken by said transfer member, means effective before the end of the decelerating period for moving the gripper shaft and grippers inwardly so as to clear the path of the sheet and effective after the transfer member has come to a stop for moving the grippers into sheet gripping position.

25. In combination, a printing machine comprising a continuously rotating cylinder, a transfer member rotating in one direction only during the normal operation of the machine and having a gripper shaft and grippers mounted thereon for movement about the center of said shaft for gripping the forward edge of the sheet, said transfer member in each rotation having a stationary period, an accelerating period, and a decelerating period, means for feeding sheets one after another in lapped relation to the transfer member, stops adapted to register the forward edge of the sheet in position to be taken by said transfer member, means for causing the grippers to clear the sheet as they move past the forward edge thereof during said decelerating period, and means effective while the transfer member is stopped for causing said grippers to move outwardly and then rearwardly and inwardly into sheet gripping position.

26. In combination, a printing machine comprising a continuously rotating cylinder, a transfer member rotating in one direction only during the normal operation of the machine and having grippers and a gripper contact bar for gripping the forward edge of the sheet, said transfer member in each rotation having a stationary period, an accelerating period and a decelerating period, means for locking the transfer member against movement during said stationary period, means for feeding sheets one after another in lapped relation to the transfer member, stops adapted to register the forward edge of the sheet in position to be taken by said transfer member, means effective before the end of the deceleration period for moving the grippers inwardly so as to clear the sheet as the grippers move past the forward edge thereof, and effective after the transfer member has come to a stop for moving the grippers outwardly and then rearwardly and inwardly into sheet gripping position.

27. In combination, a printing machine comprising a continuously rotating cylinder, a transfer member rotating in one direction only during the normal operation of the machine and having grippers for gripping the forward edge of the sheet, a movable shaft upon which said grippers are mounted, said transfer member in each rotation having a stationary period, an accelerating period and a decelerating period, means for feeding sheets one after another in lapped relation to the transfer member, stops adapted to register the forward edge of the sheet in position to be taken by said transfer member, means for retracting the gripper shaft to cause the grippers to clear the sheet as they move past the forward edge thereof during the said decelerating period, and means effective after the transfer member has come to a stop for moving said gripper shaft outwardly and for swinging the grippers rearwardly and inwardly on their shaft into sheet gripping position.

28. Mechanism for feeding sheets to a continuously rotating sheet handling cylinder of a printing or other machine, comprising a rotary transfer member having grippers thereon adapted to grip a sheet presented thereto and transfer the same to said sheet handling cylinder, said transfer member having in each cycle of rotation a stationary period, an accelerating period and a decelerating period, means for imparting the desired rotation to said transfer member, and means for presenting a sheet to said transfer member for each rotation thereof comprising means for advancing sheets in lapped relation to a position of rest adjacent the transfer member at a speed independent of the variations in speed of the transfer member.

29. Mechanism for feeding sheets individually to a continuously rotating sheet handling cylinder of a printing or other machine comprising means for feeding sheets one after another in lapped relation to a position of rest, a rotary transfer member having grippers for gripping the forward edge of a sheet in said position of rest and transferring the same to said sheet handling cylinder, said transfer member having in each rotation a stationary period, an accelerating period and a decelerating period, driving means for said transfer member including gear teeth adapted to mesh during at least a portion of a rotation of the transfer member and to be out of mesh when the transfer member is stationary, said driving means also including means for holding the transfer member against movement during said stationary period while said gear teeth are out of mesh, and gripper operating means operable to withdraw the grippers inwardly of the transfer member to clear the plane of said sheet support prior to gripping a sheet thereon and to move the grippers outwardly and close them on a sheet while said transfer member is held in stationary position by said holding means.

30. In a printing press or like machine, a continuously rotating sheet handling cylinder, a rotary sheet transfer member cooperating therewith and means for imparting variable rotation to said transfer member, said means comprising a uniformly rotating driving member, a driving roller thereon adapted to cooperate with a driven cam on the transfer member to accelerate the latter from a stationary condition to the speed of the sheet handling cylinder, gearing for driving the transfer member after it has been thus accelerated, and further driving and driven elements for decelerating the transfer member from the speed imparted thereto by the gearing to a stationary condition.

31. Mechanism as claimed in claim 30 in which said cam and roller are so arranged that the path of the roller at the beginning of its engagement with the cam is substantially tangent to the face of the cam whereby smooth initial acceleration is obtained.

32. In a printing press or like machine, a continuously rotating sheet handling cylinder, a rotary sheet transfer member cooperating therewith and means for imparting variable rotation to said transfer member, said means comprising a uniformly rotating driving member, a first roller on said driving member, a first cam on said transfer member with which said roller cooperates to produce accelerating movement of said transfer member to the speed of the sheet handling cylinder, a second roller on said driving member, a second cam on said transfer member with which said second roller cooperates to produce decelerating movement of said transfer member, and gearing for rotating said transfer member between successive movements of acceleration and deceleration imparted thereto by the cams and rollers.

33. Mechanism as claimed in claim 29, including a shaft for said grippers mounted for bodily movement within said transfer member.

34. Mechanism as claimed in claim 29, including a shaft carrying said grippers mounted for bodily movement toward and away from the center of said transfer member, said gripper operating means comprising means operable to move said shaft away from the center of said transfer cylinder independently of rotation of the latter.

35. Mechanism as claimed in claim 5, including a shaft for said grippers mounted for bodily movement toward and away from the center of said transfer member, and means for thus moving said shaft in synchronism with said machine.

CHARLES W. HARROLD.
JAMES R. WOOD.
CHRISTEN R. KADDELAND.